United States Patent [19]

Connin

[11] 4,310,236
[45] Jan. 12, 1982

[54] COPY SHEET ALIGNMENT FOR FLASH-ON-THE-FLY COPIERS

[75] Inventor: John L. Connin, Longwood, Fla.

[73] Assignee: Eastman Kodak Company, Rochester, N.Y.

[21] Appl. No.: 84,332

[22] Filed: Oct. 12, 1979

[51] Int. Cl.³ .............................................. G03G 15/00
[52] U.S. Cl. ................................ 355/14 SH; 271/227; 271/245; 271/254; 355/3 SH
[58] Field of Search .................. 355/3 R, 3 SH, 14 R, 355/14 SH; 271/227, 228, 245, 246, 247, 253, 254, 255

[56] References Cited

U.S. PATENT DOCUMENTS

| | | |
|---|---|---|
| 3,240,487 | 3/1966 | Templeton .......................... 271/228 |
| 3,343,450 | 9/1967 | Glaser et al. ............... 355/14 SH X |
| 3,660,670 | 5/1972 | Howard .................... 250/222 PC X |
| 3,955,494 | 5/1976 | Suzuki ............................ 271/254 X |
| 4,076,408 | 2/1978 | Reid et al. ...................... 355/14 SH |

Primary Examiner—Fred L. Braun
Attorney, Agent, or Firm—Raymond L. Owens

[57] ABSTRACT

In a flash-on-the-fly, web-type copier, copy sheets fed to a transfer station are adjusted to align such sheets with transferable document images formed on the web to compensate for positional deviations of such document images from nominal or expected image positions.

12 Claims, 10 Drawing Figures

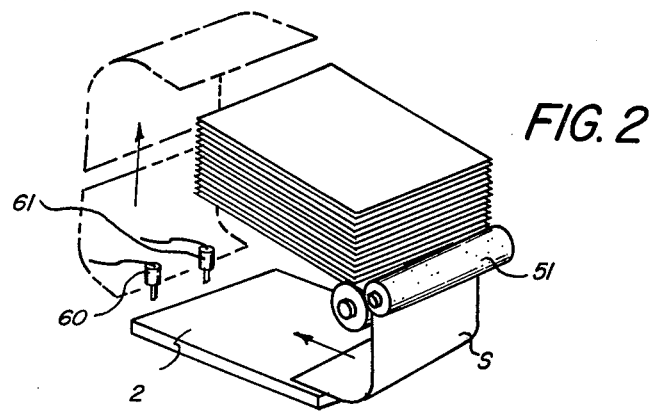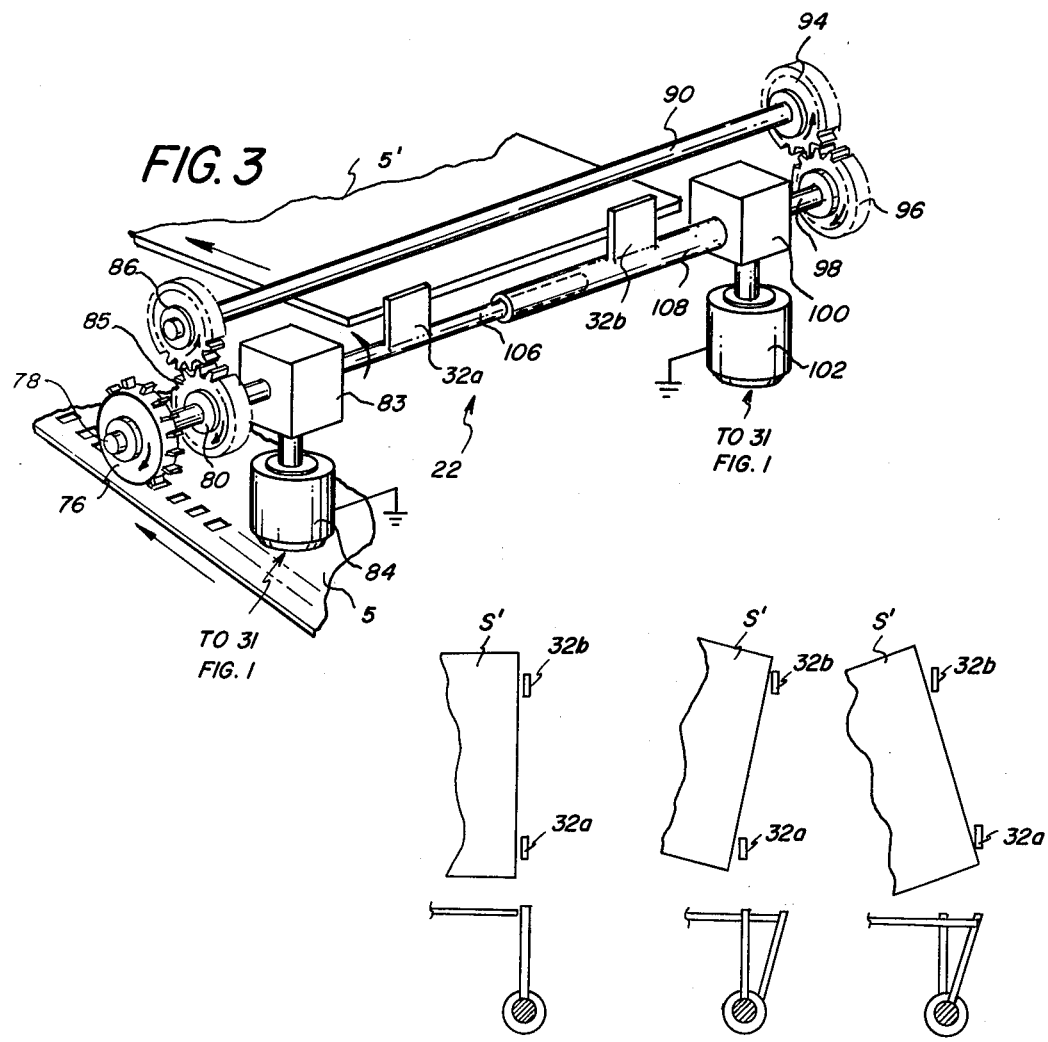

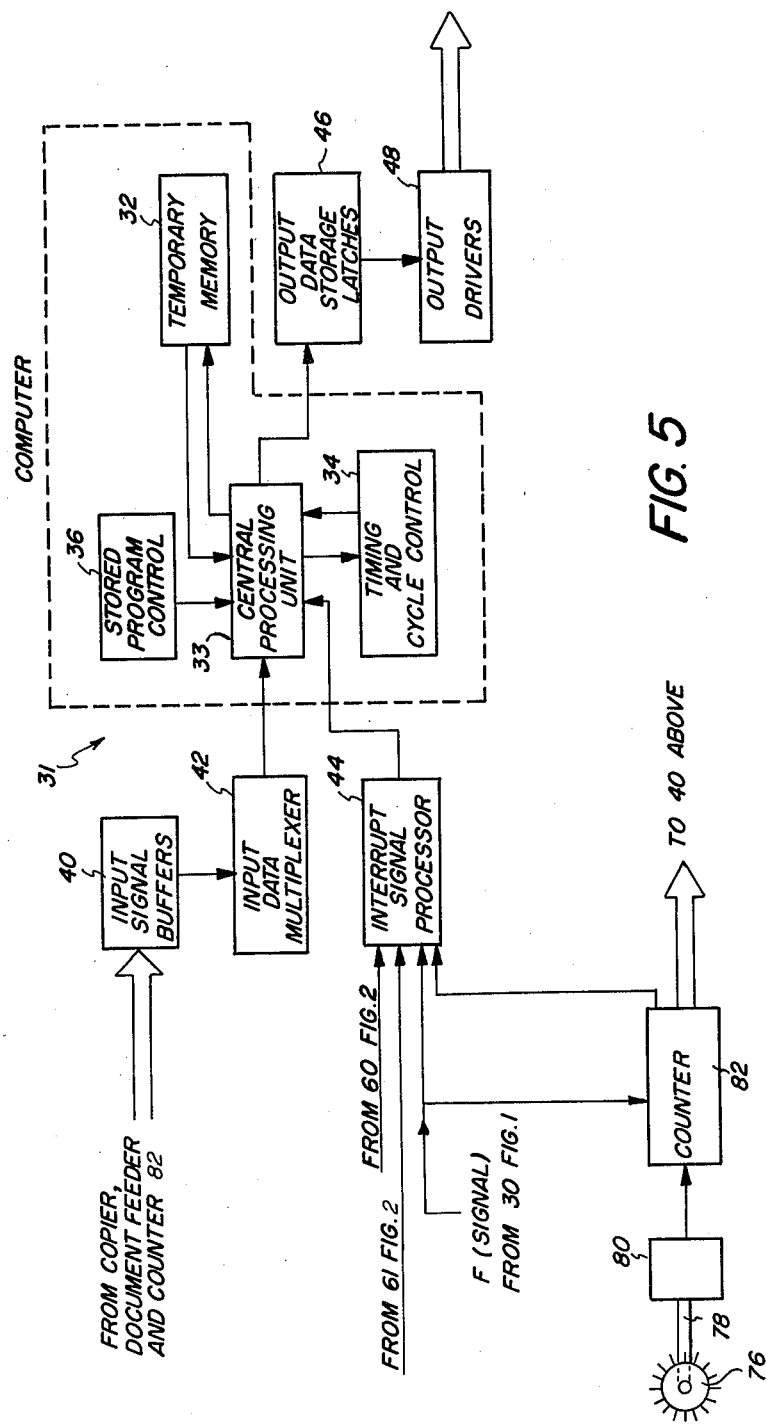

COPY SHEET ALIGNMENT FOR FLASH-ON-THE-FLY COPIERS

FIELD OF THE INVENTION

This invention relates to electrographic copiers. More particularly it relates to apparatus and method for adjusting the feed of copy sheets so that such sheets move into alignment with transferable images formed by a copier.

DESCRIPTION OF THE PRIOR ART

In a common form of electrographic copier apparatus, a transferable image of an information medium (such as a document) is formed on a photoconductor in response to image-wise actinic radiation from the medium. The photoconductor is transported along an endless path relative to a plurality of work stations.

In applications in which the photoconductor is continually reused, the photoconducter can be constructed in the form of a drum, a plate, or an endless web. The endless web configuration has certain advantages over drums and plates. Among its advantages is the fact that a web can be disposed in a flat configuration at one location to facilitate flash exposure of a document which typically is in a flat configuration during exposure, and in a curved configuration in another location to facilitate separation of a copy sheet from the web. Because of the flat configuration of the web at the exposure position, web-type copiers lend themselves to flash-on-the-fly.

"Flash-on-the-fly" as used herein means that an image of a document is formed by flash exposure on a photoconductor while such document is in motion across an exposure position such as the platen of an exposure station. Flash exposure, because of short duration and high intensity, optically stops an image of a document on the web even though both the document and web may be moving.

"Flash-on-the-fly" copiers offer an advantage in that they eliminate the need to stop or halt a document at a precise position on the platen by engagement of the leading edge of a document with registration gates. This reduces document jams, leading edge damage to document when it engages a registration gate.

If a document is misaligned on the platen when it is flash exposed, there will be a positional deviation of the transferable document image from a nominal or expected position on a photoconductor. For example, if the arrival time of a moving document at an exposure platen is advanced or retarded slightly with respect to an expected arrival time, the resulting document image will be offset slightly from its expected position on the photoconductor. Further, since the document is moving when flash exposed, if it is skewed with respect to the desired position on the platen, a skewed document image will be formed onto the photoconductor.

DESCRIPTION OF THE DRAWINGS

FIG. 2 is a partial perspective of the feeder of FIG. 1;

FIG. 3 is a perspective of the adjustable registration and copy sheet feeding mechanism of FIG. 1;

FIGS. 4A–C sets forth several diagrams showing the various positions of the registration fingers of the mechanism of FIG. 3;

FIG. 5 is a block diagram of the logic and control unit shown in FIG. 1;

SUMMARY OF THE INVENTION

Figure 1:
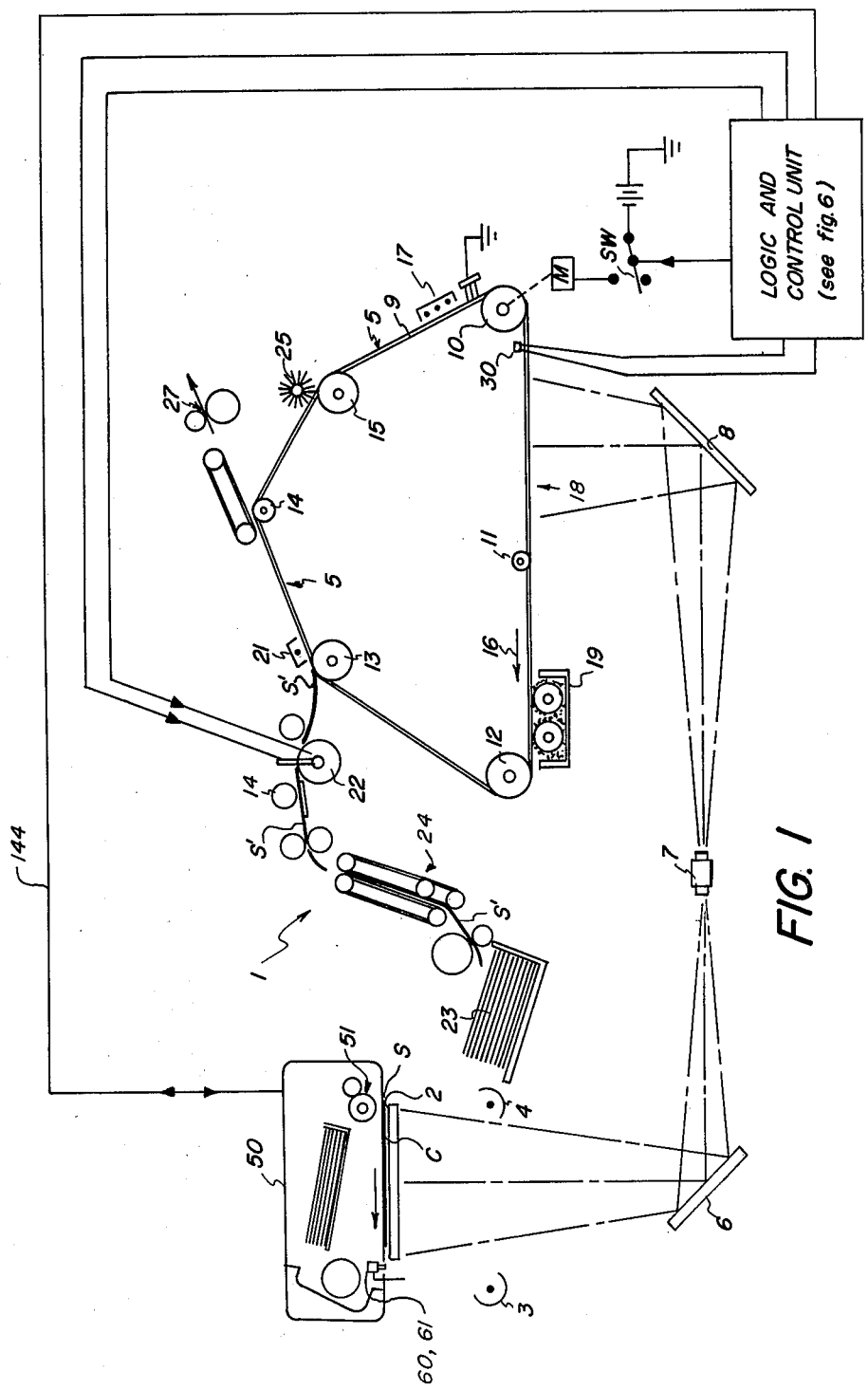
FIG. 1 is a schematic showing a side elevational view of a flash-on-the-fly copier and a feeder and a logic and control unit in accordance with the invention.

The present invention provides improved apparatus which compensates for positional deviations of transferable images. An error signal is produced which represents the positional deviation of a transferable image on an image forming member from a nominal image position. Means responsive to the error signal cause an adjustable copy sheet registration and feeding mechanism to feed a copy sheet to a transfer station into proper alignment with the image on the image forming member.

In accordance with the disclosed preferred embodiment, sensors in the feeder determine the positional deviation of a document at the copier exposure platen which corresponds to the positional deviation of the document image formed on the photoconductor from a nominal or expected position. If the arrival time is advanced or retarded with respect to a desired arrival time or if the document is skewed, an error signal is produced by the sensors. An adjustable registration and copy sheet feeding mechanism in response to this signal adjusts the feed of a copy sheet to compensate for the positional deviation of the image by positioning the copy sheet in alignment with the image.

DESCRIPTION OF THE PREFERRED EMBODIMENT

To assist in understanding the present invention, it will be useful to consider a flash-on-the-fly copier which includes an electrographic copier, a logic and control unit, and a recirculating feeder. At the outset, it will be noted that although this invention is suitable for use with recirculating feeders, it can also be used with other document feeders. Whenever the term "document" is used it refers to a particular document of an original document set having one or more documents. The term "copy sheet" refers to a sheet with a fixed image which is produced by a copier.

RECIRCULATING FEEDER

A recirculating feeder 50 is positioned on top of exposure platen 2. The recirculating feeder may be similar to that disclosed in commonly assigned U.S. Pat. No. 4,076,408 issued Feb. 28, 1979 wherein a plurality of documents having images only on first sides of the documents can be repeatedly fed in succession from a document stack or set to an exposure platen 2 of copier 1. Because we are dealing with "flash-on-the-fly", the feeder 50 does not include a registration gate to stop documents at the platen; it continuously moves documents across the platen.

The feeder 50 includes feed rollers 51 which transport a document S across the exposure platen 2 of the copier 1. The platen 2 is constructed of transparent glass. When energized, two xenon flash lamps 3 and 4 flash illuminate the moving document S. For a specific disclosure of an illumination arrangement, see commonly assigned U.S. Pat. No. 3,998,541 issued Dec. 31, 1976. As best shown in FIG. 2, sensors 60 and 61 are disposed adjacent to the downstream edge of the platen 2. For a specific example of one kind of edge sensor (e.g. photocell) that can be used, see commonly assigned U.S. Pat. No. 3,660,670. When the leading edge of document S covers these sensors, they provide signals to a logic and control unit (LCU) 31 which determines positional deviation at the time of flash. By means of an object mirror 6, lens system 7, and a image mirror 8, an image of the illuminated document is optically stopped on discrete image areas of a moving image forming member. The disclosed image forming member is a photoconductor shown as a photoconductive web 5.

ELECTROPHOTOGRAPHIC COPIER

The photoconductive web 5 includes a photoconductive layer with a conductive backing on a polyester support. The photoconductive layer may be formed from, for instance, a heterogeneous photoconductive composition such as disclosed in commonly assigned U.S. Pat. No. 3,615,414 issued Oct. 24, 1971. The web 5 is trained about six transport rollers 10, 11, 12, 13, 14 and 15, thereby forming an endless or continuous belt. For more specific disclosures of the photoconductor, see commonly assigned U.S. Pat. Nos. 3,615,406 and 3,615,414, both issued Oct. 26, 1971. Roller 10 is coupled to a drive motor M in a conventional manner. Motor M is connected to a source of potential V when a switch SW is closed by the logic and control unit (LCU) 31. When the switch SW is closed, the roller 10 is driven by the motor M and moves the web 5 in a clockwise direction indicated by arrow 16. This movement causes successive image areas of the web 5 to sequentially pass a series of electrophotographic work stations of the copier.

For the purpose of the instant disclosure, the several copier work stations along the web's path of movement include:

a charging station 17 at which the photoconductive surface 9 of the web 5 is sensitized by receiving a uniform electrostatic charge;

an exposing station 18 at which the inverse image of the document S is projected into the photoconductive surface 9 of the web 5; the image dissipates the electrostatic charge at the exposed areas of the photoconductive surface 9 and forms a latent electrostatic image on surface 9;

a magnetic brush developing station 19 at which developing powder, including electroscopic toner particles having an electrostatic charge opposite that of the latent electrostatic image, is brushed over the photoconductive surface 9 of the web 5; this causes the toner particles to adhere to the latent electrostatic image to form a visible toner particle, transferable image resembling the document S; an exemplary magnetic brush developing station is described in commonly assigned U.S. Pat. No. 3,543,720 to Drexler et al;

a transfer station shown as a corona charger 21, at which the toner image on web 5 is transferred to a copy sheet S' by electrostatic transfer means; and a cleaning station 25 at which the photoconductive surface 9 of the web 5 is cleaned of any residual toner particles remaining thereon after the transferable images have been transferred and is discharged of any residual electrostatic charge remaining thereon.

After transfer of the unfixed electroscopic images to a copy sheet S', it is transported to fuser 27 where the transferred toner particles forming the image are fused to the copy sheet.

To coordinate operation of the various work stations 17, 18, 19, 21 and 25 with movement of the image areas on the web 5 past these stations, the web has a plurality of perforations (see FIG. 3) along one of its edges. These perforations generally are spaced equidistantly along the edge of the web member 5. For example, the web member 5 may be divided into six image areas by F perforations; and each image area may be subdivided into 51 sections by C perforations. The relationship of the F and C perforations to the image areas is disclosed in more detail in commonly assigned U.S. Pat. No. 3,914,047. At a fixed location along the path of web movement, there is provided suitable means 30 for sensing F and C web perforations. This sensing produces input signals into a LCU 31 having a digital computer. The digital computer has a stored program responsive to the input signals for sequentially actuating then deactuating the work stations as well as for controlling the operation of many other machine functions as disclosed in U.S. Pat. No. 3,914,047.

LOGIC AND CONTROL UNIT (LCU)

Programming of a number of commercially available minicomputers or microprocessors such as an INTEL model 8080 or model 8086 microprocessor (which along with others can be used in accordance with the invention), is a conventional skill well understood in the art. The following disclosure is written to enable a programmer having ordinary skill in the art to produce an appropriate program for the computer. The particular details of any such program would, of course, depend upon the architecture of the selected computer.

Turning now to FIG. 5, a block diagram of a typical logic and control unit (LCU) 31 is shown which interfaces with the copier 1 and the feeder 50. The feeder 50 is also controlled by LCU 31. Leads 144 from feeder 50 provide inputs to and receive outputs from LCU 31 to synchronize the operation of the feeder. For a more detailed disclosure see commonly assigned U.S. Pat. No. 4,078,787. The LCU 31 consists of temporary data storage memory 32, central processing unit 33, timing and cycle control unit 34, and stored program control 36. Data input and output is performed sequentially under program control. Input data is applied either through input signal buffer 40 to a multiplexer 42 or to interrupt signal processor 44. The input signals are derived from various switches sensors, and analog-to-digital converters. The output data and control signals are applied to storage latches 46 which provide inputs to suitable output drivers 48, directly coupled to leads. These leads are connected to the work stations and to an adjustable copy sheet registration and feeding mechanism 22 to be described later.

The time sequence of machine control signals (often referred to in the art as events) is critical to the copy cycle because the copier and feeder and associated mechanisms must be powered ON and OFF in the correct sequence to assure high quality copying and to prevent paper misfeeds, misregistration and erratic operation. One way of controlling the time sequence of events and their relationship to each other is, as noted above, to sense perforations which have a fixed positional relationship to the image areas on the web 5 as these areas continue through a copier. Thus, the detection of perforations by a sensor 30 is applied to the LCU 31 through the interrupt signal processor 44 (see FIG. 5) and is used to synchronize the various control mechanisms with the location of the image areas.

Returning now to the computer, the program is located in stored program control 36 which may be provided by one or more conventional Read Only Memories (ROM). The ROM contains the operational program in the form of binary words corresponding to instructions and numbers. These programs are permanently stored in the ROM and cannot be altered by the computer operation.

Typically, the ROM is programmed at the manufacturer's facility to provide the required control functions such as work station sequential control, jam recovery, and operator observable messages. The ROM also has the required instructions controlling the operation of the mechanism 22.

The temporary storage memory 32 may be conveniently provided by a conventional, Read/Write memory or Random Access Memory (RAM).

Mechanism 22 is shown in FIGS. 1 and 3. As shown in FIG. 1, a copy sheet is fed to copy sheet registration feeding mechanism 22 by means of a conventional copier sheet advancing mechanism 24. The mechanism 22, after registering copy sheets, feeds them to correct for the positional deviation of a toner image on the photoconductor in a manner hereinafter described.

The mechanism 22 includes a support which receives sheets fed seriatim from mechanism 24 and defines a portion of the copy sheet travel path. Although only one continuously urging roller 14 is shown in FIG. 1, it will be understood that two or more rollers may be provided across the sheet travel path. For a more complete description of the rollers 14 and associated mechanisms, see commonly assigned U.S. Pat. No. 4,019,732 issued to Hunt, Jr., et al on Apr. 26, 1977.

When the mechanism 24 is activated by the LCU 31, a copy sheet S' is fed from supply 23 to the rollers 14, which then urge the sheet against rotating registration fingers 32a and 32b, respectively. See FIG. 3. The fingers 32a and 32b, may be in any one of a number of sheet engaging positions such as those shown in FIGS. 4A–C. The rollers 14 cause the sheet to buckle up against the fingers. The fingers are coupled to a sprocket 76 driven by the moving web 5. When the fingers rotate free of the sheet, the driving action of the rollers 14 and sheet buckle release cause the sheet to move forward onto the photoconductor in alignment with a toner image on the web 5. The relative position of the fingers 32a and b corrects for positional deviation of a toner image caused by the arrival of document at the exposure platen which is advanced or retarded slightly with respect to a desired arrival time or if the document is skewed.

The sprocket 76 is keyed to a shaft 78. Also keyed to the shaft 78 is a shaft encoder 80 and a gear 85. The shaft encoder 80 continuously provided high resolution pulse signals to a counter 82 as shown schematically in FIG. 5. Shaft encoders are well known in the art and transduce the shaft rotation into electrical pulses. See for example, U.S. Pat. Nos. 3,432,847 and 4,072,415. The shaft 78 also extends into a speed changing mechanism 83. A gear 86 fixed to one end of a shaft 90, is driven by gear 85. Another gear 94 is keyed to the other end of the shaft 90. The gear 94 drives another gear 96 which in turn continuously rotates a shaft 98 that provides an input into a second speed changing mechanism 100. Both the mechanisms 83 and 100 will be understood to include a gearing arrangement (not shown) for changing the direction of rotation of a shaft with respect to an input shaft. Thus, mechanism 100 causes shaft 98' to rotate in an opposite direction to that of input shaft 98. Extending from mechanism 83 is a shaft 106 to which is secured finger 32a. A hollow shaft 108 extends from mechanism 100 and carries the finger 32b. The barrel of the hollow shaft 108 receives the free end of the shaft 106 which freely rotates in such barrel.

Figure 6:
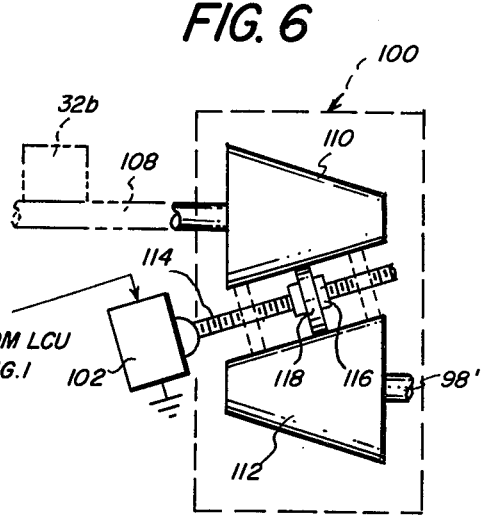
FIG. 6 shows in detail a speed changing mechanism which may be employed in accordance with the invention.

The mechanism 22 is constructed such that the fingers 32a and 32b can be individually advanced or retarded to compensate for the positional deviation of an image on the web 5. This is accomplished by the stepping motors 84 and 102 acting through speed changing mechanism 83 and 100, respectively. In FIG. 6 the mechanism 100 is provided with a cone 110 fixed to rotatable shaft 108, (viz. the tip of one cone is disposed adjacent to the base of the other cone) fixed to rotatable shaft 98', and a rotatable threaded spindle 114, journaled in support members not shown. A thimble 116 is threaded on the spindle for translational movement along the axis of the spindle. A roller 118, rotatable mounted on the thimble, engages the surface of the cones 110 and 112 with sufficient friction so that the cone 112 drives the roller 118 which drives the cone 110. The stepping motor 102 responds to a series of pulses that are provided by LCU 31 and rotates the spindle 114 in discrete increments to advance or retreat the thimble 116 to thereby accurately change the position of the roller 118 with respect to the cones. The position of the roller is determined by the LCU 31 in response to signals provided by the photocell 60 and 61. In its left hand dotted line position, the roller 118 causes the cone 110 and consequently, the shaft 108 to rotate slower than in the solid line position. When in the right hand dotted line position, the roller 118 causes the cone 110 to rotate even faster than when it is in solid line position.

Figure 7:
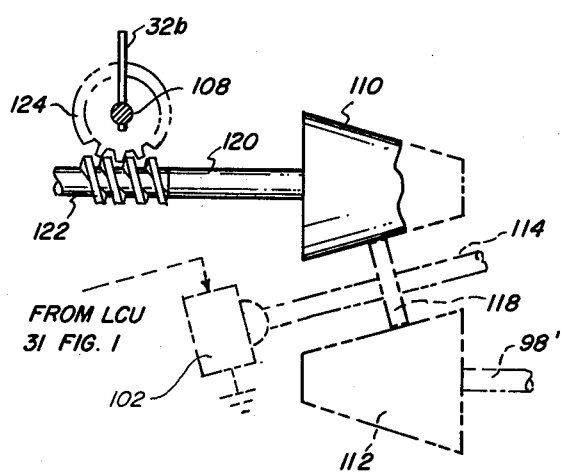
FIG. 7 shows the speed changing mechanism of FIG. 6 and a worm and gear arrangement for driving the registration finger 32B.

FIG. 7 shows the identical speed changing mechanism as in FIG. 6. However, in this view, a shaft 120 includes a worm 122 which meshes with a gear 124 keyed to the shaft 108 which carries the finger 32b. The advantage of this arrangement is that the worm and gear will more smoothly drive the shaft 108.

Figure 8:
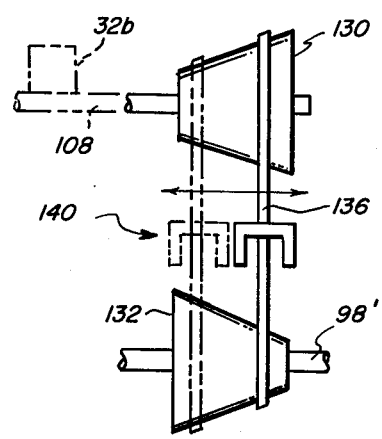
FIG. 8 shows another speed changing mechanism that can be used in accordance with invention.

Another speed changing mechanism is shown in FIG. 8 and includes a cone pulley 130 fixed to shaft 108, an identical, but reversed, in position (viz. the tip of one cone is adjacent to the base of the other cone), cone pulley 132 fixed to shaft 98', and a belt 136 trained about the cone pulleys. A shifter mechanism 140, only partially shown, will be understood to include a mechanism which in response to a stepping motor changes the position of the belt along the periphery of the cone pulleys. The stepping motor, of course, responds to pulse signals from the LCU 31. In its solid line position, the belt drives the pulley 130 and shaft 108 is rotated at a slower angular velocity than that of the shaft 98'. In its dotted line position, the shaft 108 is rotated at a faster angular velocity than when the belt in its solid line position.

In operation, after the LCU 31 calculates the position of finger 32b relative the finger 32a (this process will be described later), it applies a series of pulses to the stepping motor 102. The number of such pulses correspond to the distance or amount of offset between such fingers, and the sign of the pulses (i.e. positive or negative) determines the direction of the offset. After a sheet is engaged and released, the LCU 31 applies an appropriate series of pulses to the stepping motor 102 to bring the finger 32b into an aligned position with the finger 32a.

Stepping motors offer advantages in that they are quite accurate. Moreover since they provide incremental motion, they are readily controlled by a digital computer. Further, they often have such accuracy that the need for feedback transducers can be eliminated. Nevertheless, it is well known to provide closed-loop control of a high resolution stepping motor to insure it keeps in step with received pulses which in the instant situation are produced by the LCU 31. See for example, commonly assigned U.S. Pat. No. 3,575,653.

FIGS. 4A–C show the fingers in three different sheet engaging positions. In FIG. 4A, both the fingers are aligned; in FIG. 4B finger 32b is advanced relative to finger 32a and in FIG. 4C finger 32b is retarded relative to finger 32a.

To prevent the computer from being interrupted excessively by the high resolution signals produced by the shaft encoder 80, the counter 82 buffers these signals from the corresponding computer interrupt input (see FIG. 5). Counter 82 is reset by the F perforation signal and configured so the computer can read its contents through input signal buffers 40. Upon interrupt signals produced by the document edge sensors 60 and 61, the computer reads the contents of the counter 82.

The sequential events to correct for an image positional error caused by the arrival time of the document at the platen 2 being advanced or delayed with respect to a desired arrival time will now be set forth. Since only sensor 60 is needed to provide this operation, sensor 61 will not be described. In this case fingers 32a and b remain in an aligned position and the LCU 31 provides the identical control pulses to the stepping motors 84 and 102.

1. The LCU 31 initiates feeding of a document to the platen 2 such that its expected time of arrival will correspond to when an image area of the web 5 is centered on the exposure station 18.

2. When the document activates sensor 60, it provides a signal to the LCU 31. After receiving both this signal and an F perforation signal, the LCU 31 energizes lamps 3 and 4 and flash exposure occurs, thereby causing a latent image of the document to be formed on the web 5.

3. Simultaneous with exposure, the position of the latent image is stored in memory 32 by recording the contents of the counter 82.

4. LCU 31 calculates a number representing advance or retard required to compensate for any deviation from nominal of the location of the latent image. This is accomplished by subtracting the count recorded in step three from the count corresponding to the position of a centered latent image (a predetermined fixed number stored in program control 36). The magnitude of the calculated number corresponds to the distance fingers 32a and b must be advanced or retarded.

5. Prior to a copy sheet arriving at the registration area, but after registration had been affected for the previous sheet, the LCU 31 activates the stepping motors 84 and 102 to advance or retard the registration fingers 32a and b in accordance with the number calculated in step four. Thus, after a copy sheet engages the registration fingers, it is held by them for a time so that when it is released, it moves into proper alignment with the latent image on the web 5.

The sequential events to correct for an image positional error caused by either arrival time or skew of the document at the platen will now be set forth. Both the sensors 60 and 61 are needed to correct for skew.

1. The LCU 31 causes a document to be fed such that its expected time of arrival at the platen 2 corresponds to when an image area of the photoconductor 5 is centered at the exposure station 18.

2. Upon actuation, document sensor 60 provides a signal to the LCU 31 which after it has received this signal and an F perforation signal causes flash exposure.

3. Upon exposure, the computer stores the corresponding count held in the counter 82.

4. When activated by a leading edge of a document, a sensor 61 provides a signal to the LCU 31 which then records the corresponding count held by the counter 82. This event may occur before, during, or after step 2, depending on if the document is skewed and in which direction.

5. The computer then subtracts the count corresponding to when the sensor 60 was activated from the count corresponding to a centered latent image, (a predetermined fixed number) and this number and its sign corresponds to the distance and direction respectively that finger 32a needs to be advanced or retarded.

6. The computer then subtracts the count corresponding to when sensor 61 was actuated from count corresponding to the actuation of sensor 60, and the sign of this number corresponds to the direction and its magnitude to the distance the copy registration finger 32b need to the offset, relative to the finger 32a.

7. The LCU 31 then applies a series of pulses to the motors 84 and 102 respectively, which correspond to the distance and direction of registration finger offsets. Thus, when the copy sheet comes in contact with these fingers, it will be skewed an amount required to match the orientation of the latent image. The copy sheet is then fed forward onto the web 5 into alignment with the toner image.

8. The LCU 31 now selectively actuates the stepping motors to align the fingers.

It will be understood that in the event the LCU 31 computes that the positional deviation is outside the range which can be accommodated by the mechanism 22, then the LCU would shutdown the copier and/or provide a message to the operator.

The invention has been described with particular reference to a preferred embodiment thereof, but it will be appreciated that variations and modifications can be effected within the spirit and scope of the invention. For example, provision could also be made for additional sensors adjacent to the exposure platen to detect the side edges of a document and compensate for a positional deviation caused by a lateral offset of a document at the exposure platen. Further, it will be appreciated that the positional deviation of a document image could be determined directly from such image on a photoconductor rather than from a document at the exposure platen. In that instance detectors could be located downstream of the development station or even at the exposure station to accurately detect the boundary of each image on the web 5. Still further, the present invention is not limited to the disclosed speed changing mechanism, since any number of the speed changing mechanisms will suggest themselves to those skilled in the art and can be used in accordance with the invention.

What is claimed is:

1. In a copier having an image forming member, means for producing images at or proximate to a nominal position on the image forming member and means for forming visible representations of such images on such member which are transferable onto copy sheets, the improvement comprising:
   adjustable means for registering and feeding copy sheets into alignment with such transferable representations;
   means for providing an error signal representative of a positional deviation of a transferable representation on the image forming member from a nominal position; and
   means responsive to said error signal and operatively associated with said adjustable means for causing such adjustable means to positionally align a copy sheet with the transferable representation exhibiting said deviation.

2. For use with a copier wherein a document is flash exposed as it moves across an exposure position to form an image of the document on a moving web member which is developed and transferred onto a copy sheet, means for compensating for misalignment of the document image with respect to a nominal exposure position on the web member comprising:
   (a) adjustable copy sheet registering and feeding means for feeding a copy sheet into alignment with the document image on the web member;
   (b) means for producing at least one error signal representative of the positional deviation of a misaligned document image from said nominal position; and
   (c) means responsive to said error signal and operatively associated with said adjustable feeding means for causing such means to feed a copy sheet relative to the member into alignment with the misaligned document image.

3. A method for aligning a copy sheet at a transfer station with a transferable image of a document formed on an image forming member, comprising the steps of:
   (a) producing an electrical signal representative of the deviation of the transferable image from a nominal position on the member; and
   (b) feeding a copy sheet in accordance with such electrical signal to the transfer station so that the copy sheet is aligned with the transferable image.

4. In a flash-on-the-fly copier including a feeder for moving a document across an exposure platen, means for flash exposing such moving document to form a document image on a photoconductive web, and means for establishing a visible representation of such image on said web which is transferable to a moving copy sheet, the improvement comprising:
   (a) at least one adjustable finger for selectively engaging and then releasing a copy sheet for movement along a path into alignment with said transferable representation;
   (b) means disposed in said feeder and responsive to the presence of said document at a position on the exposure platen other than a nominal position at the instant of flash exposure for producing an error signal representative of a positional deviation of said transferable representation from said nominal position; and
   (c) logic and control means responsive to said error signal for adjusting the position of said finger and thereby of such sheet when the sheet is released by said finger.

5. The invention as set forth in claim 4 wherein said error producing means includes an optical sensor disposed adjacent to said platen.

6. The invention as set forth in claim 4 or 5 wherein said error signal represents the deviation of a document sheet from an expected arrival time at said nominal position on said platen.

7. The invention as set forth in claims 4 or 5 wherein said error signal represents the skew of a document at said exposure platen.

8. In a flash-on-the-fly copier including a feeder for moving a document across a platen, means for flash exposing such moving document at the platen to form a document image on a moving photoconductive web, and means for establishing a visible representation of such image on said web which is transferable onto a copy sheet, any deviation of the document from a nominal position at the time of flash exposure causing a corresponding deviation in the position of the image on the web, the improvement comprising:
   (a) two spaced fingers which are adjustable relative to each other for engaging an edge of a moving copy sheet for further movement along a path into alignment with said transferable representation;
   (b) first and second spaced sensors disposed in said feeder at said platen and responsive to the presence of the lead edge of said document for producing first and second error signals, respectively, such error signals having an information content representative of the positional deviation of said transferable image; and
   (c) logic and control means responsive to said error signals for adjusting the relative position of said spaced fingers when they release a copy sheet so that the released copy sheet moves into alignment with said transferable representation.

9. The invention as set forth in claim 8 wherein said positional deviation is a function of the deviation of the arrival time of the leading edge of said document at said first sensor from an expected arrival time.

10. The invention as set forth in claim 8 wherein said positional deviation is a function of the difference between the arrival time of the leading edge of said document at said first and second sensors respectively and represents the skew of said document at said exposure platen from a nominal position.

11. In a flash-on-the-fly copier, a method for aligning a moving copy sheet at a transfer station with a transferable image of a document formed on a moving web, any deviation of the document from a nominal position at the time of flash exposure causing a corresponding deviation in the position of the image on the web, comprising the steps of:
   (a) measuring the deviation in arrival time of a moving document for copying at an exposure platen from an expected arrival time to determine the positional deviation of the corresponding transferable image of the document formed on such web; and
   (b) adjusting the position of at least one copy sheet engaging, registration finger in accordance with such measured deviation; and (c) releasing the copy sheet from said finger at a time such that it arrives at said transfer station in alignment with said transferable image.

12. In a flash-on-the-fly copier, a method for aligning a moving copy sheet at a transfer station with a transferable image of a document formed on a moving web, comprising the steps of:

(a) measuring the skew of a document at an exposure platen from a nominal position;
(b) adjusting the relative position of two copy sheet engaging registration fingers in accordance with such measured skew; and
(c) releasing a copy sheet from said fingers so that when such sheet is released from the fingers it moves into alignment with said transferable image at said transfer station.

* * * * *